United States Patent
Ramazzotti et al.

[11] Patent Number: 5,332,309
[45] Date of Patent: Jul. 26, 1994

[54] REACTIVE COMPONENT MIXING WITH METERED DRY FILLER

[75] Inventors: Dario J. Ramazzotti, Grand Rapids; Ronald J. Ranalli, Caledonia; David N. Deboer, Greenville, all of Mich.

[73] Assignee: Edge-Sweets Company, Grand Rapids, Mich.

[21] Appl. No.: 872,438

[22] Filed: Apr. 23, 1992

[51] Int. Cl.$^5$ ................................................ B29B 7/00
[52] U.S. Cl. .......................................... 366/88; 366/83; 366/90; 366/132; 366/134; 366/167; 366/168
[58] Field of Search .................. 366/76, 77, 83, 182, 366/88, 90, 132, 134, 167, 168; 425/205; 222/135

[56] References Cited

U.S. PATENT DOCUMENTS

| | | | |
|---|---|---|---|
| 3,354,504 | 11/1967 | Lehner | 18/8 |
| 3,551,947 | 1/1971 | Jennings | 18/5 |
| 3,592,609 | 7/1971 | Honbo | 23/260 |
| 3,780,995 | 12/1973 | Burkle et al. | 259/183 |
| 3,843,100 | 10/1974 | Haas et al. | |
| 3,881,871 | 5/1975 | Porter | 23/252 R |
| 3,920,223 | 11/1975 | Krueger | |
| 3,920,229 | 11/1975 | Piggott | 259/192 |
| 3,942,774 | 3/1976 | Sokolow | 259/191 |
| 3,945,622 | 3/1976 | Sokolow | 259/191 |
| 3,963,558 | 6/1976 | Skidmore | 159/25 |
| 4,068,831 | 1/1978 | Ebeling et al. | 366/156 |
| 4,103,354 | 7/1978 | Gorbatov et al. | 356/321 |
| 4,124,308 | 11/1978 | Sokolow | 366/77 |
| 4,155,655 | 5/1979 | Chiselko et al. | 366/83 |
| 4,167,236 | 9/1979 | Taubenmann | 222/135 |
| 4,201,485 | 3/1980 | Walker | 366/156 |
| 4,214,859 | 7/1980 | Anders | 425/147 |
| 4,223,811 | 9/1980 | Czegledi | 222/136 |
| 4,275,033 | 6/1981 | Schulte et al. | |
| 4,303,344 | 12/1981 | Müller | 366/76 |
| 4,376,741 | 3/1983 | Stenzel | 264/45.9 |
| 4,391,529 | 7/1983 | Hedrich et al. | 366/266 |
| 4,481,308 | 11/1984 | Gray | |
| 4,482,254 | 11/1984 | Kessler et al. | 366/177 |
| 4,726,662 | 3/1988 | O'Brien | 366/323 |
| 4,850,842 | 7/1989 | Van Alstine | 425/205 |
| 4,900,158 | 2/1990 | Ugolini | 366/296 |

Primary Examiner—Paul R. Michl
Assistant Examiner—Edward Cain
Attorney, Agent, or Firm—Varnum, Riddering, Schmidt & Howlett

[57] ABSTRACT

A mixing head for thoroughly mixing and uniformly dispersing a dry filler material within a single liquid or a reactive mix. Dry filler is supplied to the compression chamber of the mixing head. A compression auger is mounted in the compression head is driven by a first drive shaft and compresses the dry filler. The speed of rotation of the compression auger is altered in response to the relative pressure of the dry filler within the compression chamber as measured by a pressure sensor. Air expelled from the compressive dry filler is removed through a port in the compression chamber. The compressed dry filler is conveyed to the mixing chamber of the mixing head. The mixing element is rotatively mounted within the mixing chamber for thoroughly mixing the dry filler with the liquid components. The mixing element is driven by a second drive shaft and can be driven in an opposite direction of rotation from the compression auger. The pitch of the flights on the mixing element can be opposite that of the pitch of the flights of the compression auger.

47 Claims, 7 Drawing Sheets

REACTIVE COMPONENT MIXING WITH METERED DRY FILLER

BACKGROUND OF THE INVENTION

1. Field of the Invention

This invention relates to a reactive component mixing apparatus and method for mixing the reactive components with filler. In one of its aspects, it relates to metering a dry filler into a reactive plural component mixture. In another of its aspects, the invention relates to a mixing head for dispensing a reactive mixture of components blended with a dry filler.

2. Description of Related Art

In many applications for polyurethane materials and other similar reactive components both cellular and noncellular it has been found beneficial to incorporate a dry filler material into the liquid polyurethane components. Examples of other reactive components include polyesters, epoxies, silicone, alkyd, acrylics and the like. Examples of filler materials include butane filled beads, solid or foam scrap regrind, global fiberglass, sand or melamine. Dry fillers such as melamine have a tendency to agglomerate which, if not broken up, could result in an inconsistent dispersion of the dry filler throughout the hardened polyurethane. This condition can create varying properties throughout the resulting polyurethane article.

Apparatuses have been developed to mix dry fillers with liquid polyurethane components. Examples of such mixing apparatuses are disclosed in U.S. Pat. No. 4,275,033, issued Jun. 23, 1981 to Schulte et al. and U.S. Pat. No. 3,920,233, issued Nov. 18, 1975 to Krueger. In each of these apparatuses, dry filler is supplied to a mixing head by rotating feed screws. The dry filler is then mixed with the liquid components by a mixing screw mounted on the same shaft as the feed screw.

U.S. Pat. No. 3,843,100 issued Oct. 22, 1974 to Haas et al. shows a polyurethane mixing head which combines a dry filler with the previously mixed liquid components. The filler and liquid components are mixed by a plurality of vanes and flights mounted to a rotating shaft within the mixing chamber.

U.S. Pat. No. 4,481,308 to Gray incorporates a screw conveyor to introduce urea into a mixing head for combination with the liquid polyurethane components. The mixing head incorporates a mixing screw to mix the urea and the previously mixed liquid components.

One problem which each of these mixing heads suffers from is the ability to accurately vary the amount of dry filler introduced into the mixing chamber in relation to the conditions as they presently exist within the mixing chamber. Another problem is that air is frequently entrapped within the dry filler and can cause air bubbles in the hardened product. Further some of the dry fillers such as butane filled beads are crushed if exposed to high shear forces. None of the prior dry filler polyurethane mixing heads appear to effectively eliminate entrained air from the mixing head. In addition, none of the dry filler mixing heads allow independent control of the mixing speed versus the feed rate.

SUMMARY OF INVENTION

The mixing apparatus according to the invention solves these problems to create a polyurethane material with uniformly disbursed dry filler in a prescribed quantity. The mixing apparatus according to the invention also removes air from the mixture, thereby avoiding air bubbles in the hardened product when processing solid elastomers.

The mixing apparatus according to the invention combines at least one dry filler with at least one liquid component. The apparatus comprises a dry filler feeder, a compression chamber, a compression auger, a first drive motor, a mixing chamber, a mixing element, a second drive motor, at least one liquid component inlet, a pressure sensor, and a controller. The compression chamber has an inlet in communication with the dry filler feeder to receive metered dry filler therefrom and an outlet a spaced distance from the inlet. The compression auger is received within the compression chamber. The first drive motor is linked to the compression auger for imparting rotation thereto and for moving the dry filler from the compression chamber inlet to the compression chamber outlet. The mixing chamber has an inlet in communication with the compression chamber outlet to receive the dry filler therefrom. A mixing chamber outlet is a spaced distance from the mixing chamber inlet. The mixing element is rotatably mounted within the mixing chamber. The second drive motor is linked to the mixing element for imparting rotation thereto and for mixing the dry filler and liquid component. The drive motor also conveys the mixture out of the mixing chamber outlet. The at least one liquid component inlet is in fluid communication with one of the mixing chamber and compression chamber for injecting a liquid component therein. The pressure sensor is mounted to the compression chamber for measuring the relative pressure of the dry filler within the compression chamber. The pressure sensor generates a signal representative of the pressure of the dry filler in the compression chamber. The controller is connected to the first drive motor and to the pressure sensor. The controller is responsive to the signal representative of the pressure of the dry filler in the compression chamber to control the speed of the motor to maintain the pressure within the compression zone within a predetermined range.

In another embodiment, a first port is mounted in the compression chamber for removal of any air from the compression chamber.

In a further embodiment, a vacuum source is applied to the first port.

In yet another embodiment, flights are mounted on the mixing element for mixing the dry filler and liquid component and conveying the mixture through the mixing chamber. The spacing of the mixing element flights varies along the length of the mixing element.

In another embodiment, a second port is mounted in the mixing chamber for removal of any air from the mixing chamber.

In a further embodiment, a vacuum source is applied to the second port.

In yet another embodiment, the compression auger has flights mounted thereon for compressing and conveying the dry filler through the compression chamber, and the mixing element has flights mounted thereon for mixing the dry filler and liquid component and conveying the mixture through the mixing chamber. The compression auger flights are oriented opposite the mixing element flights to thoroughly mix the dry filler and breakup any agglomerates of the dry filler.

In another embodiment, compression auger flights are mounted on the compression auger wherein the spacing of the compression auger flights varies along the length of the compression auger to compress the dry filler and convey the filler from the compression chamber to the mixing chamber.

In a further embodiment, the first drive shaft and the second drive shaft are concentrically mounted with respect to each other.

In yet another embodiment, a second liquid component inlet is in fluid communication with one of the mixing chamber and compression chamber for injecting a second liquid component therein.

In a further embodiment, the first drive motor is a variable speed motor.

In another embodiment, the mixing apparatus according to the invention comprises a feeder for dry filler, a compression chamber, a compression auger received within the compression chamber, a first drive motor, a mixing chamber, a mixing element rotatively mounted in the mixing chamber, a second drive motor, and at least one liquid component inlet. The compression chamber has a dry filler inlet in communication with the dry filler feeder to receive dry filler therefrom. The compression chamber also has an outlet a spaced distance from the inlet. The first drive motor is linked to the compression auger for imparting rotation thereto for moving the dry filler from the compression chamber inlet to the compression chamber outlet and for compressing the dry filler. The mixing chamber has an inlet in communication with the compression chamber outlet to receive the dry filler therefrom. A mixing chamber outlet is a spaced distance from the mixing chamber inlet. The second drive motor is linked to the mixing element for imparting rotation thereto for mixing the dry filler and liquid component into a slurry mixture and conveying the mixture out of the mixing chamber outlet. The at least one liquid component inlet is in fluid communication with one of the mixing chamber and compression chamber for injecting a liquid component therein.

In one embodiment, the amount of dry filler contained in the slurry mixture is consistently maintained by matching the diameter of the nozzle to the diameter of the dry filler inlet according to the formula;

$$G_m = (N)(C) \left[ \frac{\left(\frac{x}{D}\right)^2}{\sqrt{1 - \left(\frac{x}{D}\right)^4}} \right] (D \text{ in.})^2 \sqrt{\Delta P \, P_f}$$

where;
$G_m$ is the desired mass flow rate of the slurry from the mixing head;
N is a constant for venturi flow, which for English units of measurements equals 0.099;
C is a sizing factor equal to 0.995;
D is the diameter of the dry filler inlet:
$\Delta P$ is the change in pressure of the dry filler from the dry filler inlet diameter to the exit nozzle diameter;
$P_f$ is the density of the dry filler; and
x is the exit nozzle diameter.

The invention also encompasses a method for combining at least one dry filler with reactive liquid components. The method comprises the steps of continuously conveying metered dry filler through a feed zone to a mixing zone, measuring the pressure of the dry filler within the feed zone, mixing the dry filler and reactive liquid components, conveying the dry filler and liquid component mixture from the mixing head and altering the rate at which the dry filler is supplied to the mixing zone in response to the pressure measurement. This maintains a constant desired pressure of dry filler in the feed zone and thus a constant feed rate.

In a further embodiment, the dry filler is compressed to separate entrapped air from the dry filler.

In yet another embodiment, the entrapped air from the dry filler is removed.

In yet another embodiment, the dry filler and reactive liquid component mixture is compressed to separate entrapped air from the mixture.

In a further embodiment, the entrapped air is removed from the dry filler and reactive liquid component mixture.

In another embodiment, shear forces are applied to the dry filler to break up any dry filler agglomerates.

BRIEF DESCRIPTION OF THE DRAWINGS

The invention will now be described with reference to the drawings wherein.

DESCRIPTION OF THE PREFERRED EMBODIMENT

Figure 1:
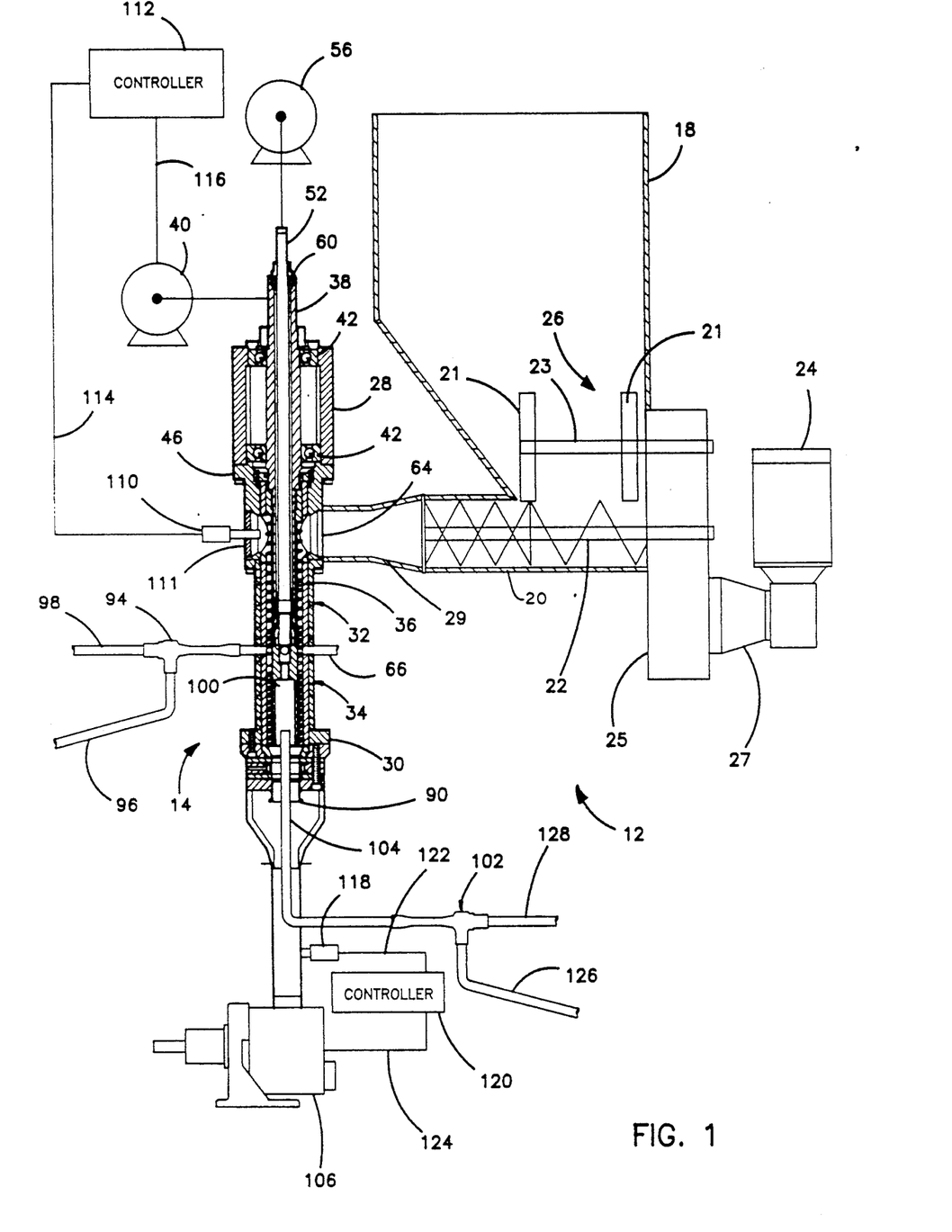
FIG. 1 is a diagrammatic view, partly in section of a mixing apparatus according to the invention.

Referring now to the drawings and to FIG. 1 in particular, a reactive component mixing apparatus 12 for polyurethane, for example, comprises a mixing head 14 and a dry filler feeder 16 which is in fluid communication with the mixing head 14. The dry filler feeder 16 comprises a hopper 18, a dry filler chamber 20, a dry filler feed screw 22, a dry filler motor 24, and an agitator 26. Dry filler material such as butane filled beads, solid or foam regrind, fiberglass, sand or melamine is deposited into the hopper 18. The agitator 26 comprises a plurality of vanes 21 mounted on a rotatable shaft 23. The shaft 23 is rotated by the dry filler motor 24. The shaft 23 is linked to the dry filler motor 24 through a conventional belt and pulley (not shown) mounted in a belt housing 25. The belts within the belt housing 25 are linked to a gear reduction box 27 which is in turn linked to the dry filler motor 24. Rotation of the agitator 26 loosens the dry filler at the base of the hopper 18 and supplies the dry filler to the dry filler chamber 20.

The dry filler motor 24 also drives the dry filler feed screw 22 through a conventional belt and pulley (not shown) mounted in the belt housing 25 and the gear reduction box 27. The dry filler feed screw 22 is rotatively mounted within the dry filler chamber 20. The dry filler feed screw 22 has flights formed thereon such that the dry filler is conveyed through the dry filler chamber 20 to a dry filler nozzle 29 and ultimately to the mixing head 14. Preferably, the speed of rotation of the agitator 26 is approximately five times faster than the speed of rotation of the dry filler feed screw 22.

The cross-sectional area of the dry filler nozzle 29 decreases from the dry filler chamber 20 to the mixing head 14. This decrease in cross-sectional area serves to provide an initial compression of the dry filler as it enters the mixing head 14.

The mixing head 14 comprises an upper housing 28, a lower housing 30, a compression chamber 32, and a mixing chamber 34. The compression chamber 32 and mixing chamber 34 are in fluid communication with one another, preferably tubular in shape and axially aligned. The upper housing 28 is preferably mounted to the top of the compression chamber 32 and the lower housing 30 is preferably mounted to the bottom of the mixing chamber 34.

Referring now to FIGS. 1–4, a compression auger 36 is rotatively mounted within the upper housing 28 and the compression chamber 32. The compression auger 36 is fixedly attached to a first annular drive shaft 38 which is rotated by a first drive motor 40 through a conventional drive belt and pulley (not shown). Preferably, the first drive motor 40 is a variable speed motor such as a regenerative Baldor Motor having 7.5 horsepower.

A polyethylene liner 48 is preferably mounted in the compression chamber 32 and mixing chamber 34 to permit free rotation of the compression auger 36 within the compression chamber 32 and the mixing element 50 within the mixing chamber 34.

Figure 2:
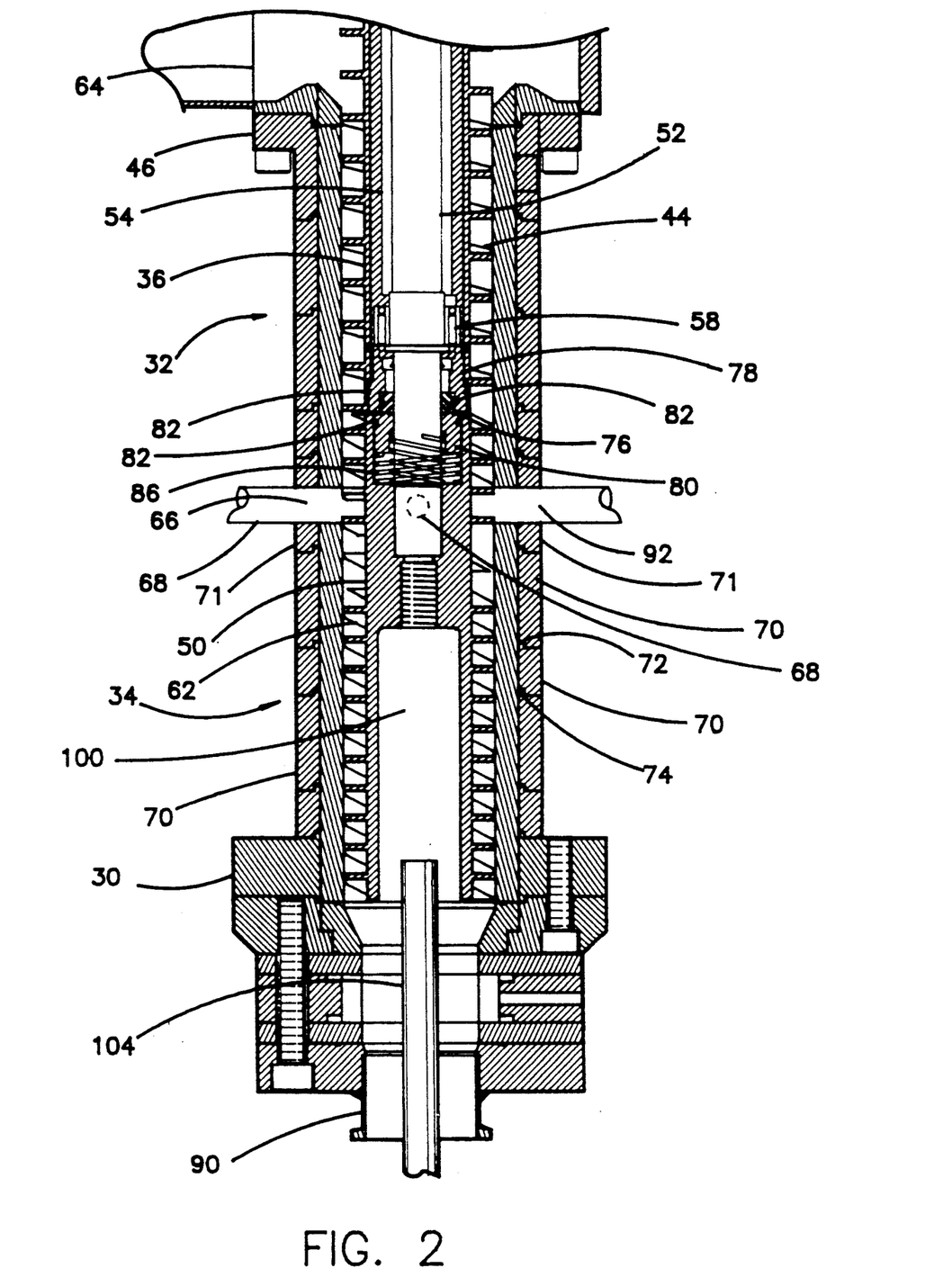
FIG. 2 is an enlarged partial sectional view of a portion of the mixing apparatus shown in FIG. 1 and illustrating a compression chamber and mixing chamber of the mixing head according to the invention.

The first drive shaft 38 is rotatively mounted and supported in the upper housing 28 by conventional ball bearing assemblies 42.

A mixing element 50 is rotatively mounted within the mixing chamber 34 and mounted to a second drive shaft 52. The mixing element 50 and second drive shaft 52 are rotated by a second drive motor 56 (FIG. 1). The second drive shaft 52 is linked to the second drive motor 56 by a conventional drive belt and pulley (not shown). An example of a motor suitable for use as the second drive motor is a regenerative Baldor Motor having 7.5 horsepower. The second drive shaft 52 is telescopically received within a central bore 54 of the first annular drive shaft 38. As seen in FIGS. 1 and 2, a needle bearing assembly 58 and roller bearing assembly 60 support and permit rotation of the second drive shaft 52 relative to the first drive shaft 38. These bearing assemblies are conventional.

The dry filler is introduced into the mixing head 14 through a dry filler inlet 64 at the top of the compression chamber 32. The liquid components for polyurethane, namely polyol and isocyanate are introduced into the mixing chamber through a first liquid inlet 66 and a second liquid inlet 68, respectively. The liquid components are injected into the mixing head 14 by a conventional metering pump system (not shown) such as a Hydura variable displacement axial pump as supplied by Edge-Sweets Company of Grand Rapids, Mich. As seen in FIG. 2, the first and second liquid inlets, 66 and 68, are located adjacent one another in an upper portion of the mixing chamber. It is understood, however, that the inlets can be located at different positions along the length of the mixing head 14 and need not be adjacent one another.

The cross-sectional view of the mixing chamber 34 and the compression chamber 32, as seen in FIG. 2, shows that the chambers are constructed of a plurality of interengaging segments 70. Each segment 70 has a notch 72 milled on one end and a rim 74 formed on the opposite end. The notch 72 of one segment 70 cooperates with the rim 74 of the adjacent segment 70 to create an interlocking engagement between adjacent segments. The stack of segments 70 are held in place by a plurality of bolts (not shown) which extend through apertures in each of the segments 70. The head of the bolts are counter-sunk into the lower housing 30. An appropriate aperture is drilled and tapped in the top segment 46. The bolts (not shown) retain the segments 70 in the stacked relationship and attach the stack of segments 70 to the lower housing 30.

By creating the compression chamber 32 and mixing chamber 34 from a plurality of segments 70, the location and number of the dry filler and liquid inlets (64, 66 and 68) can be easily changed. Fewer or additional inlets or the location of the inlet within the mixing head 14 can be easily modified by replacing one or more segments 70. For example, it can be desirable to first premix one of the liquid components with the dry filler and then later, add the second liquid component to the mixture. To accomplish this function, a segment 70 with a single inlet can be mounted toward the top of the stack and another inlet can be mounted in a lower portion of the stack of the segments 70 in the mixing head 14. Alternatively, an inlet can be incorporated to inject a liquid dye or other additive to the polyurethane. Additional inlets for other liquid components could be easily incorporated into the mixing head 14 by substituting different or additional segments 70.

As seen in FIG. 2, the lower end of the compression auger 36 abuts the upper end of the mixing element 50. However, as discussed further below, the compression auger 36 and mixing element 50 rotate independently of each other. A Teflon spacer 76 can be mounted between the compression auger 36 and mixing element 50 to prevent the reactive mixtures from filling this void.

An upper seal 78 and lower seal 80 are provided at the juncture between the compression auger 36 and mixing element 50. The upper and lower seals, 78 and 80, prohibit liquid or dry filler from entering the central bore 54 of the first drive shaft 38. The lower seal 80 is biased against the upper seal by a pair of springs 86 and 87. The seals are conventional and incorporate a plurality of O-rings 82 to restrict movement of the liquid and dry filler components into the central bore 54.

In operation, dry filler is supplied to the dry filler chamber 20 from the hopper 18 with the assistance of the rotation of the agitator 26. The dry filler is conveyed through the dry filler chamber 20 by the dry filler feed screw 22. The dry filler passes through the dry filler nozzle 29 and is subjected to an initial compression. The dry filler exits the dry filler nozzle 29 and enters the compression chamber 32 through the dry filler inlet 64.

As the dry filler enters the compression chamber 32, it encounters the compression auger 36 having flights 44 machined therein. The first drive motor 40 rotates the first drive shaft 38 and the compression auger 36 in a first direction. The rotation of the threaded compression auger 36 continuously conveys the dry filler through the compression chamber 32, out of the compression chamber outlet and into the inlet of the mixing chamber 34.

As the dry filler enters the mixing chamber 34, it encounters the mixing element 50 having flights 62 machined therein. The second drive motor 56 rotates the second drive shaft 52 and mixing element 50 in a second direction. The rotation of the threaded mixing element 50 conveys the dry filler through the mixing chamber 34. As the dry filler moves through the mixing chamber 34, it is mixed with the liquid components introduced through the liquid inlets, 66 and 68 creating a slurry solution. In the preferred embodiment, the mixing element 50 is rotated faster than the compression auger, preferably at a ratio of 4 to 1. The slurry solution exits the mixing chamber 34 through the chamber outlet and then through an exit nozzle 90.

Figure 3:
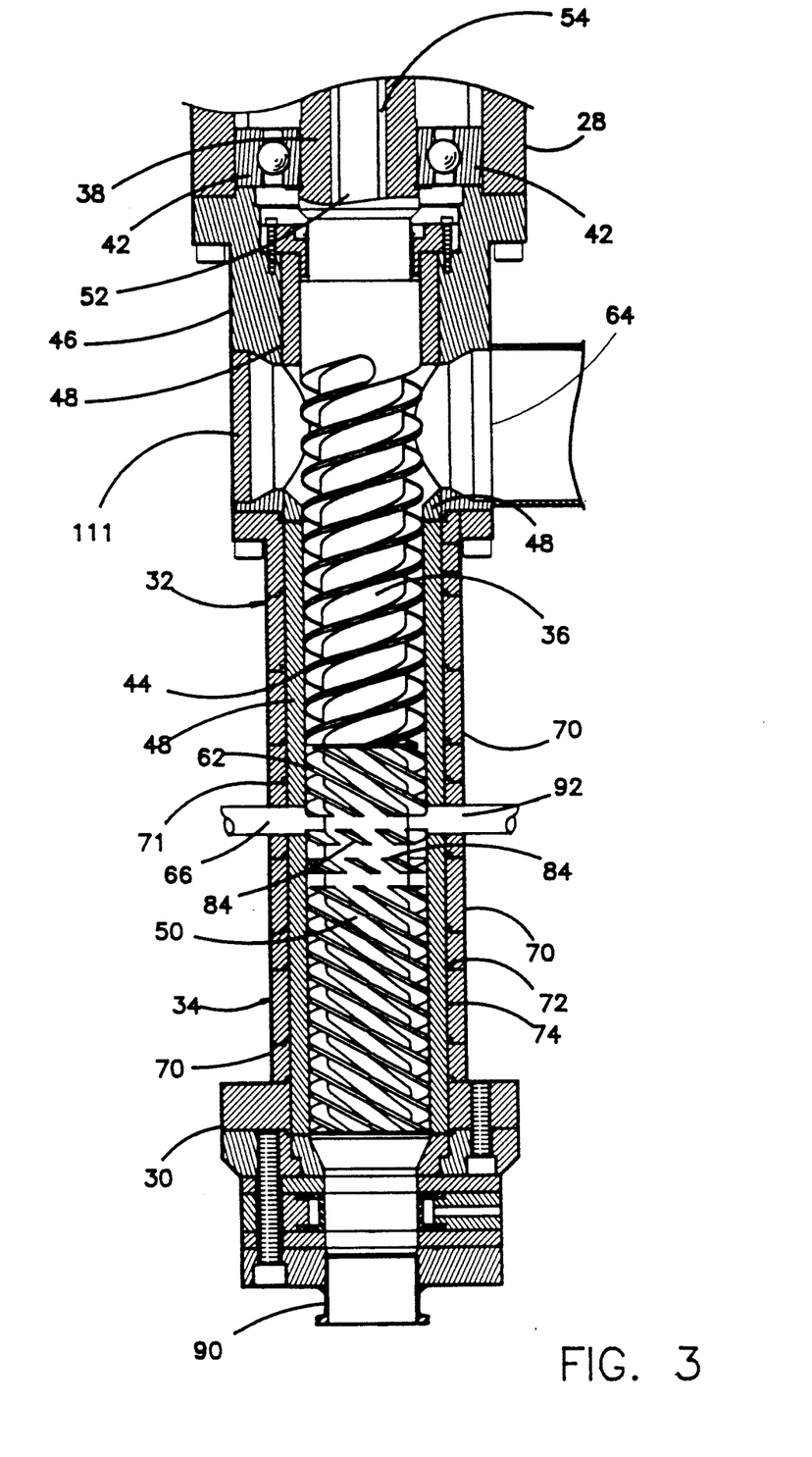
FIG. 3 is an enlarged partial sectional view of the compression chamber and mixing chamber seen in FIG. 2 showing the compression auger and mixing element in full view.

As seen in FIG. 3, the mixing element flights 62 are interrupted adjacent to the liquid inlets, 66 and 68. The flights are interrupted by slots to create a plurality of vanes 84. The rotation of the vanes 84 mounted on the mixing element thoroughly mixes the liquid components with the dry filler.

The basic mixing apparatus described above can be modified in several different ways to adapt it for various applications. For example, as seen in FIG. 3, the mixing element flights 62 are oriented in a direction opposite from the pitch of the compression auger flights 44. In this configuration, the first drive shaft 38 and compression auger 36 are rotated in a first direction and the second drive shaft 52 and mixing element 50 are rotated in a second direction, opposite from the first.

Because of the opposite orientation of the pitch of the flights on the mixing element 50 and compression auger 36 and the different directions of rotation, the dry filler and liquid components are conveyed through the mixing head 14 and out the exit nozzle 90. However, at the juncture between the compression auger 36 and the mixing element 50, a large amount of shear force is applied to the dry filler. This high shear action serves to break up any agglomerates typically found in some dry fillers, such as melamine. By breaking up the agglomerates, a more uniform dispersion of dry filler throughout the liquid solution can be achieved.

Figure 4:
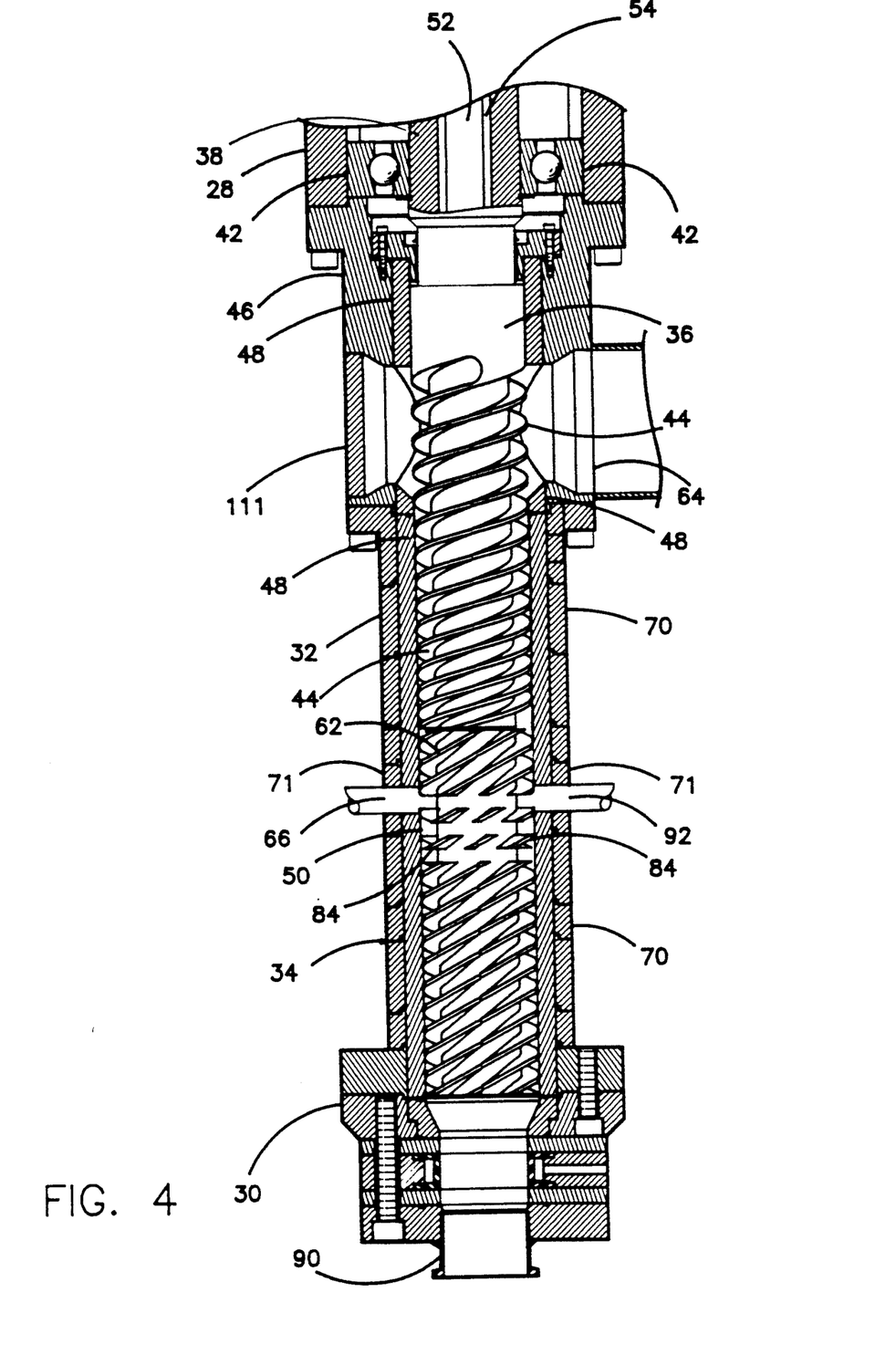
FIG. 4 is an enlarged partial sectional view like FIG. 3 and illustrating an alternative embodiment of the invention having a compressing auger.

A further modification of the basic mixing head apparatus is seen in FIG. 4. In this embodiment, the spacing of the compression auger flights 44 decreases along the length of the auger between the dry filler inlet 64 and the end of the compression chamber 34 adjacent the mixing chamber 34. By decreasing the spacing between the compression auger flights 44, the dry filler is compressed as it is conveyed through the compression chamber 34. Compression of the dry filler separates entrained air from the dry filler. The compressed dry filler is conveyed into the mixing chamber 34, mixed with the liquid components and conveyed through the exit nozzle 90.

As seen in FIGS. 1 and 4 a first port 92 can be formed in a port segment 71 of the mixing chamber 34 to provide an outlet for air expelled from the compressed dry filler. Alternatively, the port can be formed in a segment of the compression chamber 32. A vacuum source is typically applied to the first port 92 through a suitable device such as a first eductor 94. The first eductor 94 has a compressed air inlet 96 and an air outlet 98. The compressed air enters the first eductor 94 through the compressed air inlet 96, passes through a nozzle (not shown) of decreasing area and exits through the air outlet 98. Movement of the compressed air through the nozzle of the first eductor 94 creates a vacuum at the first port 92 to remove any air present within the mixing chamber 34.

Figure 5:
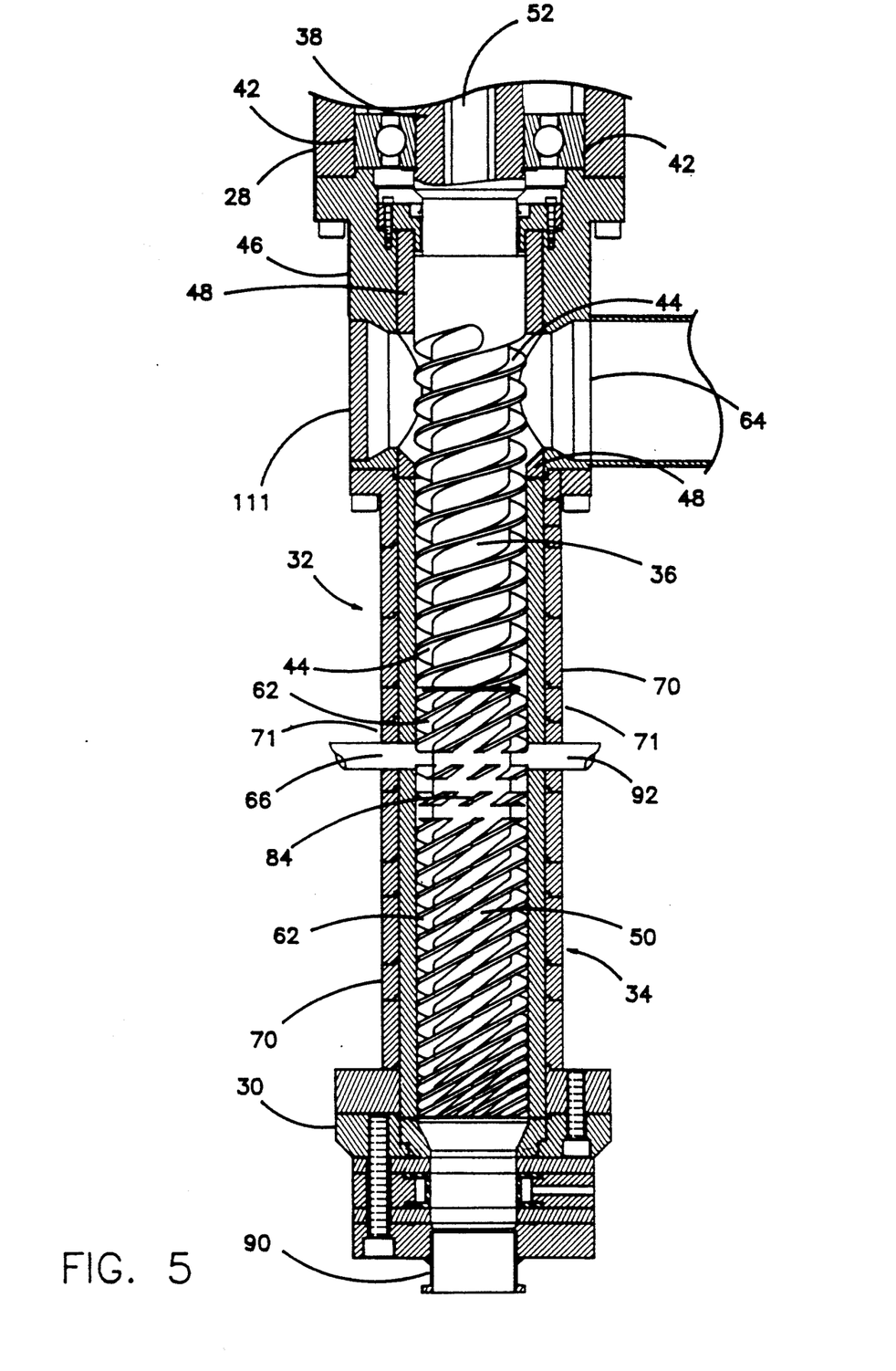
FIG. 5 is an enlarged partial sectional view like FIG. 3 and illustrating a third embodiment of the invention having a compressing mixer.

A further embodiment of the mixing apparatus 12 according to the invention is seen in FIG. 5. In this embodiment, the spacing between the mixing element flights 62 decreases along the length of the element from the mixing chamber inlet to the mixing chamber outlet adjacent the exit nozzle 90. By decreasing the spacing between the flights 62, the liquid solution is compressed. The compression of the solution pumps the compressed liquid solution through the outlet and exit nozzle 90 under pressure. By pumping the solution through the outlet and nozzle 90, the compressed solution can be supplied to a suitable molding operation.

Although the reverse pitch mounting of the compression auger 36 and mixing element 50 (FIG. 3), the varying spacing of the compression auger flights 44 (FIG. 4) and the varying spacing of the mixing element flights 62 (FIG. 5) are described in different figures, it is understood that a single mixing head can incorporate one, or a combination of each of these three variations to achieve different mixing results in a single mixing head.

As a result of the compression by the flights 62 of the mixing element 50, air can also collect further downstream in the mixing head in an air chamber 100 (FIG. 2). The air chamber 100 is located at the terminal end of the mixing element. A second eductor 102 is in fluid communication with the air chamber 100 through a second port 104. The second eductor 102 has a compressed air inlet 126 and an air outlet 128. The compressed air enters the second eductor 102 through the compressed air inlet 126, passes through a nozzle (not shown) of decreasing area and exits through the air outlet 128. Movement of the compressed air through the second eductor 102 creates a vacuum at the second port 104 to remove any air present in the air chamber 100.

In many applications it may be desirable to mount a pump, such as a progressing cavity pump 106, to the exit nozzle 90 to supply the slurry mixture to a molding or spraying operation. As seen in FIG. 1, a pump 106 is in fluid communication with the exit nozzle 90 via a inlet cylinder 108. An example of a suitable pump is a variable speed drive Moyno progressing cavity pump.

One problem in mixing a dry filler into polyurethane is to introduce the same amount of dry filler into the mixing chamber 34 to create a liquid solution stream having a constant amount of dry filler over a period of time. Maintaining a consistent flow of dry filler into the mixing chamber 34 becomes more complicated when adding low specific gravity fillers such as foam regrind and microspheres.

For example, certain low density fillers such as butane filled spheres known as Expancel must be compacted uniformly to achieve accuracy in metering the dry filler into the slurry. One embodiment of the mixing apparatus as seen in FIG. 1 overcomes this problem by compacting the dry filler and varying the amount of dry filler introduced into the mixing chamber in response to the pressure of the filler within the compression chamber 32. Experimentation has shown that low density fillers must first be compacted in the compression chamber by about twenty percent (20%) of the cross-sectional area. This amount of compression will achieve a back pressure of 0.1 inches of water in the compression chamber.

As seen in FIG. 1, a first pressure sensor 110 is mounted to a fitting 111 which is in turn mounted to the compression chamber. The sensor detects the relative pressure of the dry filler within the compression chamber 32. The pressure sensor 110 is electronically connected to a controller 112 through a conductor 114. The controller is programmed to be responsive to an input signal from the pressure sensor 110. The controller 112 is connected electronically to the first drive motor 40 through conductor 116. The controller 112 is also programmed to control the speed of rotation of the first drive motor 40 in response to an input signal from the pressure sensor to maintain the pressure of the dry material within a predetermined range. An example of the preferred pressure sensor is a 0–10 PSI range Red Lion pressure differential sensor and the preferred controller is an Allen Bradley PLC 5/25.

Figure 6:
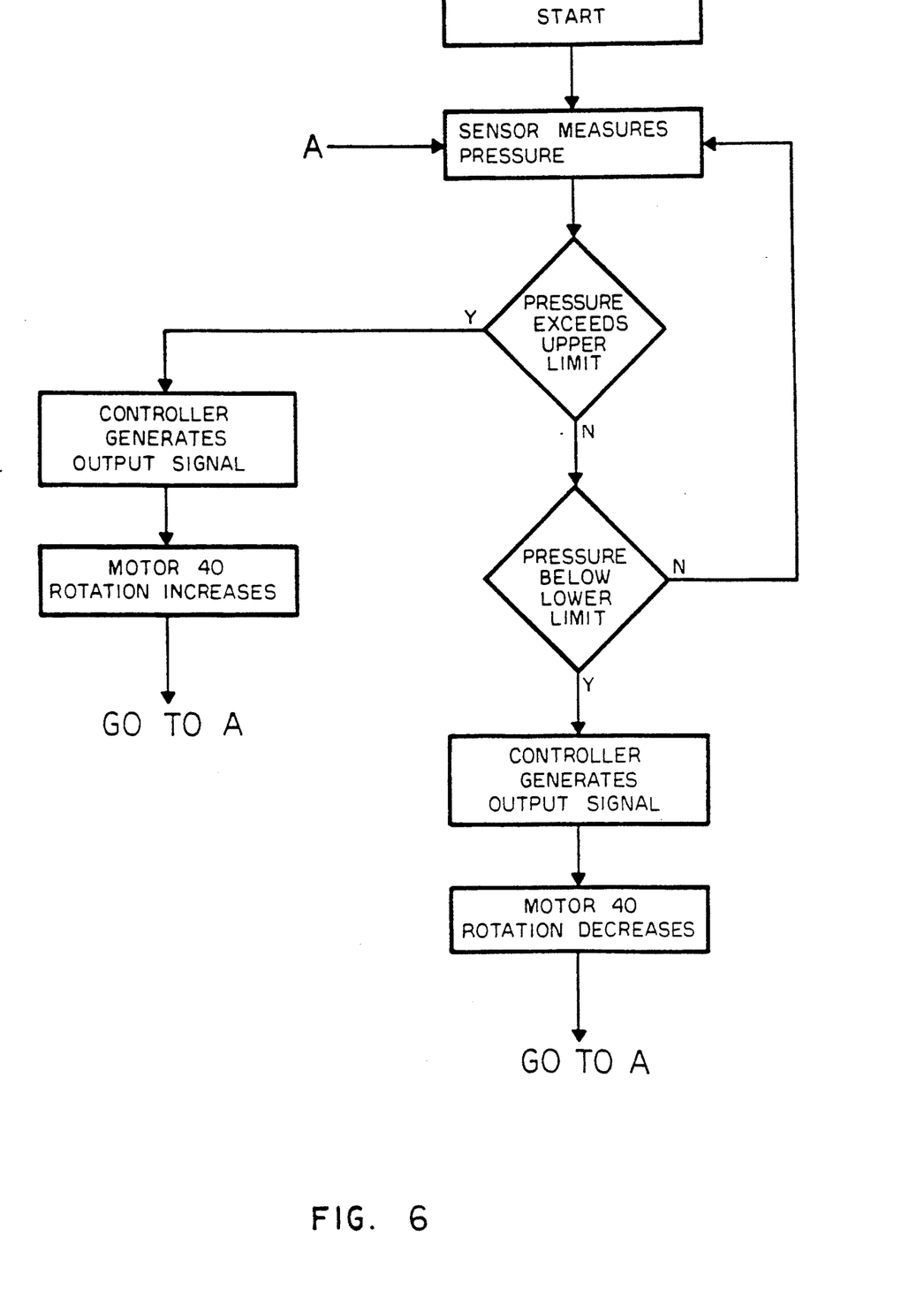
FIG. 6 is a flow chart of a control system according to one embodiment of the invention.

A flow chart of the operations of the controller and pressure sensor is seen in FIG. 6. In operation, the pressure sensor 110 measures the pressure of the dry filler within the mixing head 14 and supplies input signals to the controller 112. If the input signal indicates the pressure is too low, the controller generates an output signal to the first drive motor 40. In response to this output signal, the first drive motor 40 decreases the speed of rotation of the first drift shaft 38 and compression auger 36 to move the dry material more slowly through the mixing chamber 34.

If the controller 112 receives an input signal from the pressure sensor 110 that the pressure of the dry filler within the compression chamber 32 is too high, the controller 112 generates an output signal to the first drive motor 40. In response to this output signal, the speed of rotation of the first drive motor 40 is increased to increase the speed of movement of dry filler to the mixing chamber 34.

The use of the cooperating pressure sensor 110, controller 112 and variable speed first drive motor 40 creates a mixing head apparatus 12 which maintains a back pressure in the compression chamber at a predetermined level. By compacting the dry filler and keeping the pressure of the dry filler within the compression chamber 32 within an acceptable range, the mixing head produces a liquid slurry solution with a consistent amount of dry filler in solution.

In a further embodiment, a second pressure sensor 118 can be mounted to the pump inlet cylinder 108 to detect the relative pressure of the slurry as it flows from the exit nozzle 90. The second pressure sensor 118 is electronically connected to a pump controller 120 through conductor 122. The pump controller 120 is electronically connected to the pump 106 through conductor 124. The second pressure sensor 118 provides input signals to the pump controller 120. The pump controller 120 is programmed to be responsive to the input signals and to generate an output signal to the pump 106.

Figure 7:
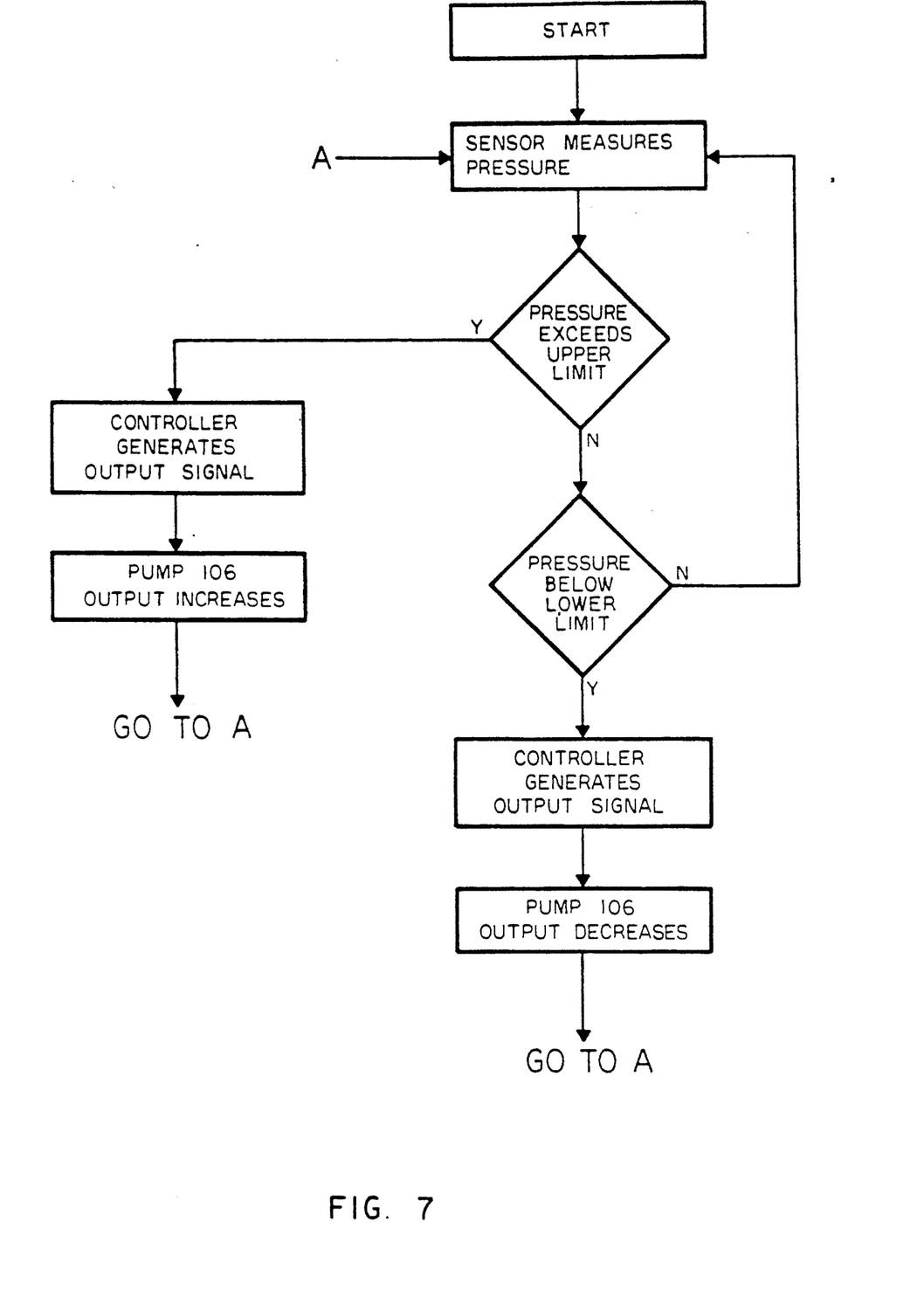
FIG. 7 is a flow chart of a control system according to another embodiment of the invention.

A flow diagram of the operation of the second pressure sensor 118 and the pump controller 120 is seen in FIG. 7. In operation, the pump controller 120 receives input signals from the second pressure sensor 118. If the pressure of the liquid solution within the pump inlet cylinder 108 is too high, the pump controller 120 generates a first output signal to the pump 106 to increase the action of the pump thereby pumping more solution from the cylinder 108. In the event that the input signal from the second pressure sensor 118 is too low, the pump controller 120 generates a second output signal to the pump 106 to slow the action of the pump, thereby slowing the removal of solution from the cylinder 108.

A liquid slurry solution having a consistent amount of low density dry filler in solution can also be created without the expense of the pressure sensors and controllers by prescribing the sizes of the mixing head inlet and outlet as a result of certain mathematical formulas based upon the flow of the dry filler through a venturi orifice. The solution to the mathematical formulas determines the diameter of the exit nozzle 90 based upon a specified flow rate for the slurry solution and the diameter of the dry filler inlet 64. The diameter of the nozzle centers around the solution to the following formula:

$$G_m = K\sqrt{\Delta P p_f} \qquad (1)$$

Where:
$G_m$ = the mass flow of filler;
$K$ = a sizing factor for liquid flow through the venturi orifice;
$\Delta P$ = the change in pressure of the filler from the larger dry filler inlet diameter to the smaller exit nozzle diameter; and
$p_f$ = the density of the flowing filler.

The sizing factor K can be calculated using another standard formula for venturi flow:

$$K = NSD_2 \qquad (2)$$

Where:
$N$ = a constant for venturi flow, which in English measurement units equals 0.099;
$D$ = the diameter of the dry filler inlet 64;
$S$ = a sizing factor based upon the ASME flow nozzle charts and the solution of the following formula:

$$S = CB^2/\sqrt{1 - B^4} \qquad (3)$$

Where:
$B$ = the smaller exit nozzle diameter over the larger dry filler inlet diameter; and
$C$ = a sizing factor equal to 0.995.

These formulas can be applied to a common low density filler commonly known as Expancel DE, which are butane filled microspheres made by Nobel Industries of Sweden.

EXAMPLE 1

For a desired flow rate of 3.88 pounds per minute of slurry containing a filler of Expancel DE from a reactive component mixing head according to the invention, the solution of the critical flow formulas 1–3 is as follows with the following assumptions:
a 6 inch dry filler inlet diameter;
a desired dry filler back pressure of 0.1 inches of water;
a 4-to-1 ratio for the speed of rotation of the mixing element to the compression auger;
the density of ideally compact Expancel DE equalling 0.065 g/cc; and
a conversion factor for the conversion of the specific gravity of Expancel DE to pounds per cubic inch of 0.36.

$$\left(3.88 \frac{\text{lbs}}{\text{min}}\right)\left(\frac{1 \text{ min}}{60 \text{ sec}}\right) = (0.099)(.995) \left[\frac{\left(\frac{x}{6}\right)^2}{\sqrt{1-\left(\frac{x}{6}\right)^4}}\right] (6 \text{ in.})^2 \sqrt{(.1 \text{ in. H}_2\text{O})(.065 \text{ g/cc})(.036)}$$

Solving for x, x = 5.25 inches.

Therefore, based upon the flow rate of 3.88 pounds per minute of slurry containing Expancel DE and a dry filler inlet 64 diameter of 6 inches, the diameter of the nozzle 90 should be 5.25 inches to maintain a consistent back pressure of 0.1 inches of water of compacted dry filler and a consistent flow of dry filler in the slurry mixture,

EXAMPLE 2

A lower feed rate can also be selected for a dry filler, For example, for a desired feed rate of 1.20 pounds per minute of slurry from the mixing head according to the invention, the solution of the critical flow formulas 1–3 is as follows with the following assumptions:
a 6 inch dry filler inlet diameter;
a desired dry filler back pressure of 0.1 inches of water;
a 4-to-1 ratio for the speed of rotation of the mixing element to the compression auger;
the density of ideally compact Expancel DE equalling 0.065 g/cc; and
a conversion factor for the conversion of the specific gravity of Expancel DE to pounds per cubic inch of 0.36.

$$\left(1.20 \frac{\text{lbs}}{\text{min}}\right)\left(\frac{1 \text{ min}}{60 \text{ sec}}\right) = (0.099)(.995) \left[\frac{\left(\frac{x}{6}\right)^2}{\sqrt{1-\left(\frac{x}{6}\right)^4}}\right] (6 \text{ in.})^2 \sqrt{(.1 \text{ in. H}_2\text{O})(.065 \text{ g/cc})(.036)}$$

Solving for x, x = 3.52 inches.

Therefore, based upon the flow rate of 1.20 pounds per minute of slurry containing Expancel DE and a dry filler inlet 64 diameter of 6 inches, the diameter of the nozzle 90 should be 3.52 inches to maintain a consistent back pressure of 0.1 inches of water of compacted dry filler and a consistent flow of dry filler in the slurry mixture.

The mixing head according to the invention provides two different alternatives for achieving the same end result, i.e., a liquid slurry having a uniform amount of dry filler in solution therein. The dry filler is compacted as it is introduced into the mixing chamber of the mixing head and then mixed with the liquid components to create the slurry. The uniform amounts of compacted dry filler can be maintained by maintaining a desired level of back pressure of dry filler within the mixing head, or, alternatively, selecting a desired flow rate and calculating the dry filler inlet and slurry outlet diameters of mixing head. The mixing apparatus according to the invention solves many of the problems encountered in effectively mixing dry fillers in polyurethane and other reactive component materials. The apparatus is particularly well suited for mixing low specific gravity dry fillers in the liquid solution. Other examples of reactive liquid components which can be used with the mixing head include polyesters, epoxies, silicone, alkyd, acrylics and the like.

While particular embodiments of the invention have been shown, it will be understood, of course, that the invention is not limited thereto since modifications can be made by those skilled in the art, particular in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. An apparatus for combining at least one dry filler with at least one liquid component comprising:
   a feeder for dry filler;
   a compression chamber having an inlet in communication with said dry filler feeder to receive dry filler therefrom and an outlet a spaced distance from the inlet;
   a compression auger received within the compression chamber;
   a first drive motor linked to said compression auger for imparting rotation thereto for moving the dry filler from the compression chamber inlet to the compression chamber outlet;
   a mixing chamber having an inlet in communication with said compression chamber outlet to receive the dry filler therefrom and an outlet a spaced distance from the mixing chamber inlet;
   a mixing element rotatively mounted within the mixing chamber;
   a second drive motor linked to the mixing element for imparting rotation thereto for mixing the dry filler and liquid component and conveying the mixture out of the mixing chamber outlet;
   at least one liquid component inlet in fluid communication with one of said mixing chamber and compression chamber for injecting a liquid component therein;
   a pressure sensor mounted to the compression chamber for measuring the relative pressure of the dry filler within the compression chamber and for generating a signal representative of the pressure of the dry filler in the compression chamber; and
   a controller connected to the first drive motor and to the pressure sensor, the controller being responsive to the signal representative of the pressure of the dry filler in the compression chamber to control the speed of the first drive motor to maintain the pressure within the compression zone within a predetermined range.

2. An apparatus according to claim 1 and further comprising a first port in said compression chamber for the removal of any air from the compression chamber.

3. An apparatus according to claim 2 and further comprising a vacuum source applied to said first port.

4. An apparatus according to claim 1 and further comprising flights mounted on said mixing element for mixing the dry filler and liquid component and conveying the mixture through the mixing chamber wherein the spacing of said mixing element flights varies along the length of the mixing element.

5. An apparatus according to claim 4 and further comprising a second port in said mixing chamber for removal of any air from the mixing chamber.

6. An apparatus according to claim 5 and further comprising a vacuum source applied to said second port.

7. An apparatus according to claim 1 wherein the compression auger has flights mounted thereon for compressing and conveying the dry filler through the compression chamber and said mixing element has flights mounted thereon for mixing the dry filler and liquid component and conveying the mixture through the mixing chamber wherein said compression auger flights are oriented opposite said mixing element flights to thoroughly mix the dry filler and breakup any agglomerates of dry filler.

8. An apparatus according to claim 1 and further comprising compression auger flights mounted on said compression auger wherein the spacing of said compression auger flights varies along the length of the auger to compress the dry filler and convey the filler from the compression chamber to the mixing chamber.

9. An apparatus according to claim 1 wherein the first drive motor is linked to the compression auger by a first drive shaft and the second drive motor is linked to the mixing element by a second drive shaft, and said first drive shaft and second drive shaft are concentrically mounted with respect to each other.

10. An apparatus according to claim 1 and further comprising a second liquid component inlet in fluid communication with one of said mixing chamber and compression chamber for injecting a second liquid component therein.

11. An apparatus according to claim 1 wherein said first drive motor is a variable speed motor.

12. An apparatus for combining at least one dry filler with at least one liquid component comprising:
- a feeder for dry filler;
- a compression chamber having an inlet in communication with said dry filler feeder to receive dry filler therefrom and an outlet a spaced distance from the inlet;
- a compression auger received within the compression chamber having flights mounted thereon and oriented in a first direction for moving dry filler from said inlet to said outlet of said compression chamber;
- a first drive motor linked to said compression auger for imparting rotation thereto to move the dry filler from the compression chamber inlet to the compression chamber outlet;
- a mixing chamber having an inlet in communication with said compression chamber outlet to receive the dry filler therefrom and an outlet a spaced distance from the mixing chamber inlet;
- a mixing element rotatively mounted within the mixing chamber having flights mounted thereon and oriented in a second direction for mixing the dry filler and liquid component and conveying the mixture from the mixing chamber inlet to the mixing chamber outlet;
- a second drive motor linked to the mixing element for imparting rotation thereto to mix the dry filler and liquid component and further to convey the mixture out of the mixing chamber outlet;
- at least one liquid component inlet in fluid communication with one of said mixing chamber and compression chamber for injecting a liquid component therein; and
- wherein the orientation of the compression auger flights is opposite the orientation of the mixing element flights and said first drive motor rotates the compression auger in a direction opposite to the direction of rotation of the mixing element as controlled by the second drive motor to thoroughly mix the dry filler and breakup any agglomerates of dry filler.

13. An apparatus according to claim 12 wherein the first drive motor is linked to the compression auger by a first drive shaft and the second drive motor is linked to the mixing element by a second drive shaft, and said first drive shaft and second drive shaft are concentrically mounted with respect to each other.

14. An apparatus according to claim 12 and further comprising;
- a pressure sensor mounted to the compression chamber for measuring the relative pressure of the dry filler within the compression chamber and generating a signal representative of the pressure of the dry filler in the compression chamber; and
- a controller connected to the first drive motor and the pressure sensor, the controller being responsive to the signal representative of the pressure of the dry filler in the compression chamber to control the speed of the motor to maintain the pressure within the compression chamber within a predetermined range.

15. An apparatus according to claim 12 and further comprising a first port mounted to said compression chamber for the removal of air expelled from the dry filler.

16. An apparatus according to claim 15 and further comprising a vacuum source applied to said first port.

17. An apparatus according to claim 12 and further comprising flights mounted on said mixing element for mixing the dry filler and liquid component and conveying the mixture through the mixing chamber wherein the spacing of said mixing flights varies along the length of the mixing element.

18. An apparatus according to claim 12 and further comprising a second port mounted to said mixing chamber for the removal of air from the mixing chamber.

19. An apparatus according to claim 18 and further comprising a vacuum source applied to said second port.

20. An apparatus according to claim 12 and further comprising a second liquid component inlet in fluid communication with one of said mixing chamber and compression chamber for injecting a second liquid component therein.

21. An apparatus for combining at least one dry filler with at least one liquid component comprising:
- a feeder for dry filler;
- a compression chamber having an inlet in communication with said dry filler feeder to receive dry filler therefrom and an outlet a spaced distance from the inlet;
- a compression auger received within the compression chamber;
- a first drive motor linked by a first drive shaft to said compression auger for imparting rotation thereto for moving the dry filler from the compression chamber inlet to the compression chamber outlet;
- a mixing chamber having an inlet in communication with said compression chamber outlet to receive the dry filler therefrom and an outlet a spaced distance from the mixing chamber inlet;
- a mixing element rotatively mounted within the mixing chamber;
- a second drive motor linked by a second drive shaft to the mixing element for imparting rotation thereto for mixing the dry filler and liquid component and conveying the mixture out of the mixing chamber outlet, one of the first and second drive shafts being concentrically mounted in the other of the first and second drive shafts;
- at least one liquid component inlet in fluid communication with one of said mixing chamber and compression chamber for injecting a liquid component therein;
- a first port mounted to said mixing head; and
- a vacuum source applied to said first port;

wherein said port and vacuum remove air expelled from the mixing head.

22. An apparatus according to claim 21 wherein said first port is mounted to the compression chamber of the mixing head.

23. An apparatus according to claim 22 and further comprising a second port mounted to said mixing chamber for the removal of air from the mixing head.

24. An apparatus according to claim 23 and further comprising a vacuum source applied to the said second port.

25. An apparatus according to claim 21 and further comprising;
- a pressure sensor mounted to the compression chamber for measuring the relative pressure of the dry filler in the compression chamber and for generating a signal representative of the pressure of the dry filler in the compression chamber; and
- a controller connected to said first drive motor and to the pressure sensor, the controller being responsive to the signal representative of the pressure of the dry filler in the compression chamber to control the speed of the first drive motor to maintain the pressure of dry filler in the compression chamber within a predetermined range.

26. An apparatus according to claim 21 wherein the mixing element has flights mounted thereon for mixing the dry filler and liquid component and conveying the mixture through the mixing chamber and the compression auger has flights mounted thereon for compressing and conveying the dry filler through the compression chamber wherein said mixing element flights are oriented in the opposite direction of the compression auger flights and said mixing element is rotated in a direction opposite the direction of rotation of the compression auger to thoroughly mix the dry filler and breakup any agglomerates of dry filler.

27. An apparatus according to claim 21 wherein said mixing element has flights mounted thereon for mixing the dry filler and liquid component and conveying the mixture through the mixing chamber and the spacing of said mixing element flights varies along the length of the mixing element.

28. An apparatus according to claim 21 wherein said compression auger has flights mounted thereon for mixing the dry filler and liquid component and conveying the mixture through the mixing chamber and the spacing of said compression auger flights varies along the length of the compression auger.

29. An apparatus according to claim 21 and further comprising a second liquid component inlet in fluid communication with one of said mixing chamber and compression chamber for injecting a second liquid component therein.

30. An apparatus for combining at least one dry filler with at least one liquid component comprising:
- a feeder for dry filler;
- a compression chamber having a dry filler inlet in communication with said dry filler feeder to receive dry filler therefrom and an outlet a spaced distance from the inlet;
- a compression auger received within the compression chamber;
- a first drive motor linked to said compression auger for imparting rotation thereto for moving the dry filler from the compression chamber inlet to the compression chamber outlet and for compressing the dry filler;
- a mixing chamber having an inlet in communication with said compression chamber outlet to receive the dry filler therefrom and an outlet a spaced distance from the mixing chamber inlet and forming an exit nozzle;
- a mixing element rotatively mounted within the mixing chamber;
- a second drive motor linked to the mixing element for imparting rotation thereto for mixing the dry filler and liquid component into a slurry mixture and conveying the mixture out of the mixing chamber outlet;
- at least one liquid component inlet in fluid communication with one of said mixing chamber and compression chamber for injecting a liquid component therein;

wherein the amount of dry filler contained in the slurry mixture is consistently maintained by matching the diameter of the nozzle to the diameter of the dry filler inlet according to the formula;

$$G_m = (N)(C) \left[ \frac{\left(\frac{X}{D}\right)^2}{\sqrt{1 - \left(\frac{X}{D}\right)^4}} \right] (D \text{ in.})^2 \sqrt{\Delta P\, P_f}$$

where;
- $G_m$ is the desired mass flow rate of the slurry from the mixing head;
- N is a constant for venturi flow, which for English units of measurements equals 0.099;

C is a sizing factor equal to 0.995;
D is the diameter of the dry filler inlet;
$\Delta P$ is the change in pressure of the dry filler from the dry filler inlet diameter to the exit nozzle diameter;
$p_f$ is the density of the dry filler; and
x is the exit nozzle diameter.

31. An apparatus according to claim 30 further comprising flights mounted on said mixing element for mixing the dry filler and liquid component and conveying the mixture through the mixing chamber wherein the spacing of said mixing element flights varies along the length of the mixing element.

32. An apparatus according to claim 30 wherein the compression auger has flights mounted thereon for compressing and conveying the dry filler through the compression chamber and said mixing element has flights mounted thereon for mixing the dry filler and liquid component and conveying the mixture through the mixing chamber wherein said compression auger flights are oriented opposite said mixing element flights to breakup any dry filler agglomerates.

33. An apparatus according to claim 30 and further comprising compression auger flights mounted on said compression auger to convey the filler from the compression chamber to the mixing chamber wherein the spacing of said compression auger flights varies along the length of the auger to compress the dry filler.

34. An apparatus according to claim 30 wherein the first drive motor is linked to the compression auger by a first drive shaft and the second drive motor is linked to the mixing element by a second drive shaft, and said first drive shaft and second drive shaft are concentrically mounted with respect to each other.

35. An apparatus according to claim 30 and further comprising a second liquid component inlet in fluid communication with one of said mixing chamber and compression chamber for injecting a second liquid component therein.

36. A method for combining at least one dry filler with reactive liquid components comprising the steps of:
continuously conveying dry filler through a feed zone to a mixing zone;
measuring the pressure of the dry filler within the feed zone;
mixing said dry filler and reactive liquid components;
conveying the dry filler and liquid component mixture from said mixing head; and
altering the rate at which the dry filler is supplied to the mixing zone in response to the pressure measurement to maintain a desired pressure of dry filler in the feed zone.

37. A method according to claim 36 and further comprising the step of compressing the dry filler to separate entrapped air from the dry filler.

38. A method according to claim 37 and further comprising the step of removing the entrapped air from the dry filler.

39. A method according to claim 36 and further comprising the step of compressing the dry filler and reactive liquid component mixture to separate entrapped air from the mixture.

40. A method according to claim 39 and further comprising the step of removing the entrapped air from the mixture.

41. A method according to claim 36 and further comprising the step of applying shear forces to the dry filler to break up any dry filler agglomerates.

42. A method for combining at least one dry filler with reactive liquid components comprising the steps of:
continuously conveying dry filler from a feed zone to a mixing zone through the rotation of a compression auger in a first direction;
mixing the dry filler with the reactive liquid components in the mixing zone through the rotation of a mixing element in a second direction, the second direction being opposite the first direction;
applying shear forces to the dry filler to break up any agglomerates in the dry filler at the junction between the feed zone and mixing zone through the opposed rotation of the compression auger and mixing element; and
conveying the dry filler and liquid component mixture from the mixing zone.

43. A method according to claim 42 and further comprising the step of compressing the dry filler to separate entrapped air from the dry filler.

44. A method according to claim 43 and further comprising the step of removing the entrapped air from the dry filler.

45. A method according to claim 42 and further comprising the step of compressing the dry filler and reactive liquid component mixture to separate entrapped air from the mixture.

46. A method according to claim 45 and further comprising the step of removing the entrapped air from the mixture.

47. A method according to claim 42 and further comprising the steps of;
measuring the pressure of the dry filler within the feed zone; and
altering the rate at which the dry filler is supplied to the mixing zone in response to the pressure measurement to maintain a desired pressure of dry filler in the feed zone.

* * * * *